US011056763B2

(12) United States Patent  
Nivala et al.

(10) Patent No.: US 11,056,763 B2  
(45) Date of Patent: Jul. 6, 2021

(54) WIRELESS COMMUNICATION IMPROVEMENTS FOR COOKING APPLIANCES

(71) Applicant: Apption Labs Limited, Leicester (GB)

(72) Inventors: Teemu Nivala, Leicester (GB); Janne Petteri Heiskanen, Lempaala (FI); Olli Toivo Talvitie, Tampere (FI); Ming-Hao Yeh, Taipei (TW)

(73) Assignee: Apption Labs Limited, Leicester (GB)

( * ) Notice: Subject to any disclaimer, the term of this patent is extended or adjusted under 35 U.S.C. 154(b) by 221 days.

(21) Appl. No.: 15/996,339

(22) Filed: Jun. 1, 2018

(65) Prior Publication Data

US 2018/0351232 A1  Dec. 6, 2018

Related U.S. Application Data

(60) Provisional application No. 62/513,921, filed on Jun. 1, 2017.

(51) Int. Cl.
*H05B 6/64* (2006.01)
*H05B 6/80* (2006.01)
(Continued)

(52) U.S. Cl.
CPC ............... *H01Q 1/22* (2013.01); *A47J 36/321* (2018.08); *G01K 1/024* (2013.01); *H01Q 1/2208* (2013.01);
(Continued)

(58) Field of Classification Search
CPC .......... H01Q 7/00; H01Q 15/18; H01Q 1/362; H01Q 19/185; H01Q 19/00; H01Q 9/285;
(Continued)

(56) References Cited

U.S. PATENT DOCUMENTS 3,815,113 A  6/1974  Welch
4,297,557 A  10/1981  Tyler et al.
(Continued)

FOREIGN PATENT DOCUMENTS

CN  103792859 A  5/2014
CN  206261474 U  6/2017
(Continued)

OTHER PUBLICATIONS

Bluetooth BBQ Thermometer—Cappec—Consumer Electronics, accessed Jun. 8, 2015 at http://cappec.com/product/bluetooth-bbq-thermometer/3 pages.
(Continued)

*Primary Examiner* — Quang T Van
(74) *Attorney, Agent, or Firm* — Barry IP Law, P.C.

(57) ABSTRACT

A wireless signal repeater includes an interior antenna located in an interior a cooking appliance, and an exterior antenna located outside the cooking appliance. A coupling portion connects the interior antenna to the exterior antenna through a hole in a wall of the cooking appliance for wirelessly retransmitting wireless signals received by the wireless signal repeater. According to another aspect, a cooking appliance includes a cooking chamber for cooking food, and an interior antenna located inside the cooking chamber. An exterior antenna is located on an exterior of the cooking appliance, and a coupling portion is configured to connect the interior antenna with the exterior antenna. According to another aspect, an aperture is located in a cooking chamber and a reflector is mounted over the aperture on an exterior of the cooking appliance and is configured to narrow a radiation pattern for wireless signals transmitted through the aperture.

28 Claims, 12 Drawing Sheets

(51) Int. Cl.

| | | |
|---|---|---|
| *G01K 1/02* | (2021.01) | |
| *H01Q 1/22* | (2006.01) | |
| *G01K 1/024* | (2021.01) | |
| *H04B 5/00* | (2006.01) | |
| *H01Q 9/42* | (2006.01) | |
| *A47J 36/32* | (2006.01) | |
| *H01Q 7/00* | (2006.01) | |
| *H01Q 15/18* | (2006.01) | |
| *H04B 7/15* | (2006.01) | |
| *H01Q 9/28* | (2006.01) | |
| *H01Q 19/185* | (2006.01) | |
| *H01Q 19/00* | (2006.01) | |
| *H01Q 1/12* | (2006.01) | |
| *H01Q 1/36* | (2006.01) | |

(52) U.S. Cl.
CPC ............... *H01Q 7/00* (2013.01); *H01Q 9/42* (2013.01); *H01Q 15/18* (2013.01); *H04B 5/0025* (2013.01); *H04B 7/15* (2013.01); *H05B 6/6467* (2013.01); *G01K 2207/06* (2013.01); *H01Q 1/1214* (2013.01); *H01Q 1/362* (2013.01); *H01Q 9/285* (2013.01); *H01Q 19/00* (2013.01); *H01Q 19/185* (2013.01)

(58) Field of Classification Search
CPC .......... H01Q 1/1214; H01Q 1/24; H01Q 1/22; H01Q 1/2208; H01Q 9/42; H04B 7/15; H04B 5/0025; H05B 6/6467; G01K 2207/06; G01K 1/024; A47J 36/321; G08B 21/182
USPC ....... 219/748, 494, 486, 506, 714, 725, 690, 219/694, 695, 696, 702, 713; 99/331, 99/324, 342, 413, 443 R; 118/723 ME, 118/723 MW; 156/723 ME, 723 MW; 426/233; 374/E1.004, E11.012, 117, 149, 374/155
See application file for complete search history.

(56) References Cited

U.S. PATENT DOCUMENTS

| | | | |
|---|---|---|---|
| 4,475,024 A * | 10/1984 | Tateda | ............... G01K 1/024 219/713 |
| 5,194,857 A | 3/1993 | Gomez | |
| 6,080,972 A | 6/2000 | May | |
| 6,486,453 B1 | 11/2002 | Bales et al. | |
| 6,550,963 B2 | 4/2003 | Daily et al. | |
| 6,568,848 B1 | 5/2003 | Chapman et al. | |
| 6,587,739 B1 | 7/2003 | Abrams et al. | |
| 6,712,505 B2 | 3/2004 | Chapman et al. | |
| 6,750,433 B2 | 6/2004 | Guenther et al. | |
| 6,753,027 B1 | 6/2004 | Greiner et al. | |
| 6,759,635 B2 | 7/2004 | Lile | |
| 6,809,301 B1 | 10/2004 | McIntyre et al. | |
| 6,949,729 B1 | 9/2005 | Ishikawa et al. | |
| 7,075,442 B2 | 7/2006 | Lion et al. | |
| 7,092,988 B1 | 8/2006 | Bogatin et al. | |
| 7,128,466 B2 | 10/2006 | Chang et al. | |
| 7,129,834 B2 | 10/2006 | Naruse et al. | |
| 7,201,099 B2 | 4/2007 | Harris, Jr. et al. | |
| 7,202,454 B2 | 4/2007 | Wiedemann et al. | |
| 7,372,368 B2 | 5/2008 | Chapman et al. | |
| 7,381,933 B2 | 6/2008 | Cristiani | |
| 7,703,389 B2 | 4/2010 | McLemore et al. | |
| 7,964,824 B2 | 6/2011 | Moon | |
| 8,145,854 B1 | 3/2012 | Lee | |
| 8,188,409 B2 | 5/2012 | Baier | |
| 8,222,578 B2 * | 7/2012 | Beier | ............... G01K 1/024 219/713 |
| 8,556,502 B2 | 10/2013 | Austen et al. | |
| 8,557,317 B2 | 10/2013 | Sonnendorfer | |
| 8,715,204 B2 | 5/2014 | Webster et al. | |
| 8,730,038 B2 | 5/2014 | Durian | |
| 8,931,400 B1 | 1/2015 | Allen | |
| 9,411,989 B2 | 8/2016 | Wild | |
| 9,799,199 B2 | 10/2017 | Allen | |
| 10,067,004 B1 | 9/2018 | Allen | |
| 10,388,141 B2 | 8/2019 | Allen | |
| 10,667,638 B2 | 6/2020 | Sun et al. | |
| 2004/0001334 A1 | 1/2004 | Choi et al. | |
| 2008/0259995 A1 | 10/2008 | Kuhn | |
| 2009/0188396 A1 | 7/2009 | Hofmann et al. | |
| 2010/0012645 A1 | 1/2010 | Baier | |
| 2012/0203082 A1 | 8/2012 | Livneh et al. | |
| 2013/0206015 A1 | 8/2013 | Jacoby et al. | |
| 2013/0269539 A1 | 10/2013 | Polt | |
| 2013/0277353 A1 | 10/2013 | Joseph et al. | |
| 2014/0049376 A1 | 2/2014 | Ng | |
| 2014/0137751 A1 | 5/2014 | Bellm | |
| 2014/0348987 A1 | 11/2014 | Cheng et al. | |
| 2015/0064314 A1 | 3/2015 | Manuel et al. | |
| 2016/0051078 A1 | 2/2016 | Jenkins et al. | |
| 2016/0069853 A1 | 3/2016 | Mitchell | |
| 2016/0238459 A1 | 8/2016 | Koetz et al. | |
| 2016/0377490 A1 | 12/2016 | Nivala et al. | |
| 2017/0138798 A1 | 5/2017 | Brown et al. | |
| 2017/0150841 A1 | 6/2017 | Johncock et al. | |
| 2017/0248474 A1 | 8/2017 | Nielsen et al. | |

FOREIGN PATENT DOCUMENTS

| | | |
|---|---|---|
| CN | 105768844 B | 5/2019 |
| DE | 4421373 A1 | 12/1995 |
| DE | 102009019613 A1 | 11/2010 |
| DE | 202010016860 U1 | 3/2011 |
| DE | 102009047418 A1 | 6/2011 |
| DE | 102010063474 | 6/2012 |
| DK | 178659 B1 | 10/2016 |
| EP | 1081476 B1 | 3/2001 |
| EP | 1577653 A1 | 9/2005 |
| EP | 1624724 A1 | 2/2006 |
| EP | 1646851 A1 | 4/2006 |
| EP | 2116829 A1 | 11/2009 |
| JP | 58135428 A | 8/1983 |
| JP | 2003110333 A * | 4/2003 |
| WO | 0170087 A2 | 9/2001 |
| WO | 2010023237 A1 | 3/2010 |
| WO | 2011067176 A1 | 6/2011 |
| WO | 2015170229 A1 | 11/2015 |
| WO | 2016210356 A1 | 12/2016 |
| WO | 2018037174 A1 | 3/2018 |
| WO | 2019012324 A1 | 1/2019 |
| WO | 2019052613 A1 | 3/2019 |

OTHER PUBLICATIONS

Brookstone Grill Alert Talking Remote Meat Thermometer, accessed Jun. 8, 2015 at http://brookstone.com/grill-alert-talking-remote-meat-thermometers 2 pages.
Grill Thermometer, accessed Jun. 8, 2015 at http://idevicesinc.com/igrill 5 pages.
Tappecue Temperature Monitoring System, accessed Jun. 8, 2015 at http://www.tappecue.com 1 page.
International Search Report dated Nov. 23, 2018, from counterpart International Application No. PCT/IB2018/000656, 16 pages.
International Search Report and Written Opinion dated Apr. 21, 2021 from International Application No. PCT/IB2020/062410, 13 pages.

* cited by examiner

WIRELESS COMMUNICATION IMPROVEMENTS FOR COOKING APPLIANCES

CROSS-REFERENCE TO RELATED APPLICATION

This application claims the benefit of U.S. Provisional Application No. 62/513,921, filed on Jun. 1, 2017, and entitled "WIRELESS SIGNAL REPEATER FOR COOKING APPLIANCES", which is hereby incorporated by reference in its entirety.

BACKGROUND

Wireless food thermometers have recently been developed to provide information to a remote device, such as a smartphone, remote station, or tablet. Examples of such wireless food thermometers are provided in pending U.S. Patent Application Publication No. 2016/0377490, entitled "FOOD THERMOMETER AND METHOD OF USING THEREOF", and filed on Jun. 24, 2016, the contents of which are hereby incorporated by reference in their entirety. The information provided to the remote device or devices may include, for example, a cooking temperature of food being cooked, an estimated time until the food has been cooked to a preferred doneness, or cooking instructions such as when to adjust a cooking temperature.

Unfortunately, most cooking appliances, such as barbeques, smokers, ovens, and grills can act as a Faraday cage or at least attenuate the wireless signal transmitted by a wireless food thermometer or another wireless device inside the cooking appliance.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of the claims.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
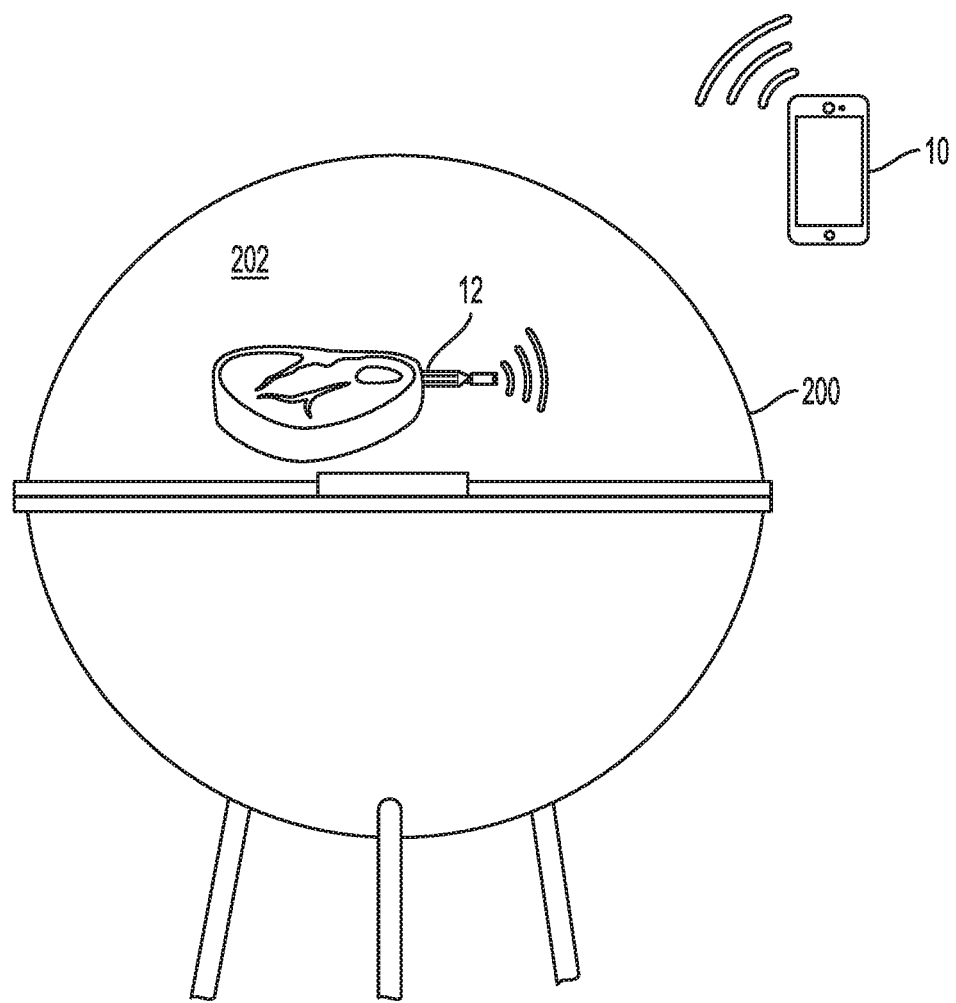
FIG. 1 illustrates an example of a wireless device inside a cooking appliance and a remote device outside of the cooking appliance for receiving a wireless signal from the wireless device.

FIG. 1 illustrates an example of wireless device 12 inside cooking appliance 200 and remote device 10 outside of cooking appliance 200 for receiving a wireless signal from wireless device 12 inside cooking chamber 202 of cooking appliance 200. In some implementations, wireless device 12 can include a wireless food thermometer, such as a wireless meat thermometer. As shown in FIG. 1, wireless device 12 transmits a wireless signal for reception by remote wireless device 10 outside of cooking appliance 200. In some implementations, the wireless signal can include a Radio Frequency (RF) signal such as, for example, a Bluetooth signal, or other wireless communication signal. Remote device 10 can include, for example, a smartphone, a laptop, a tablet, a smart watch, a desktop computer, or user interface for wireless device 12.

Figure 2:
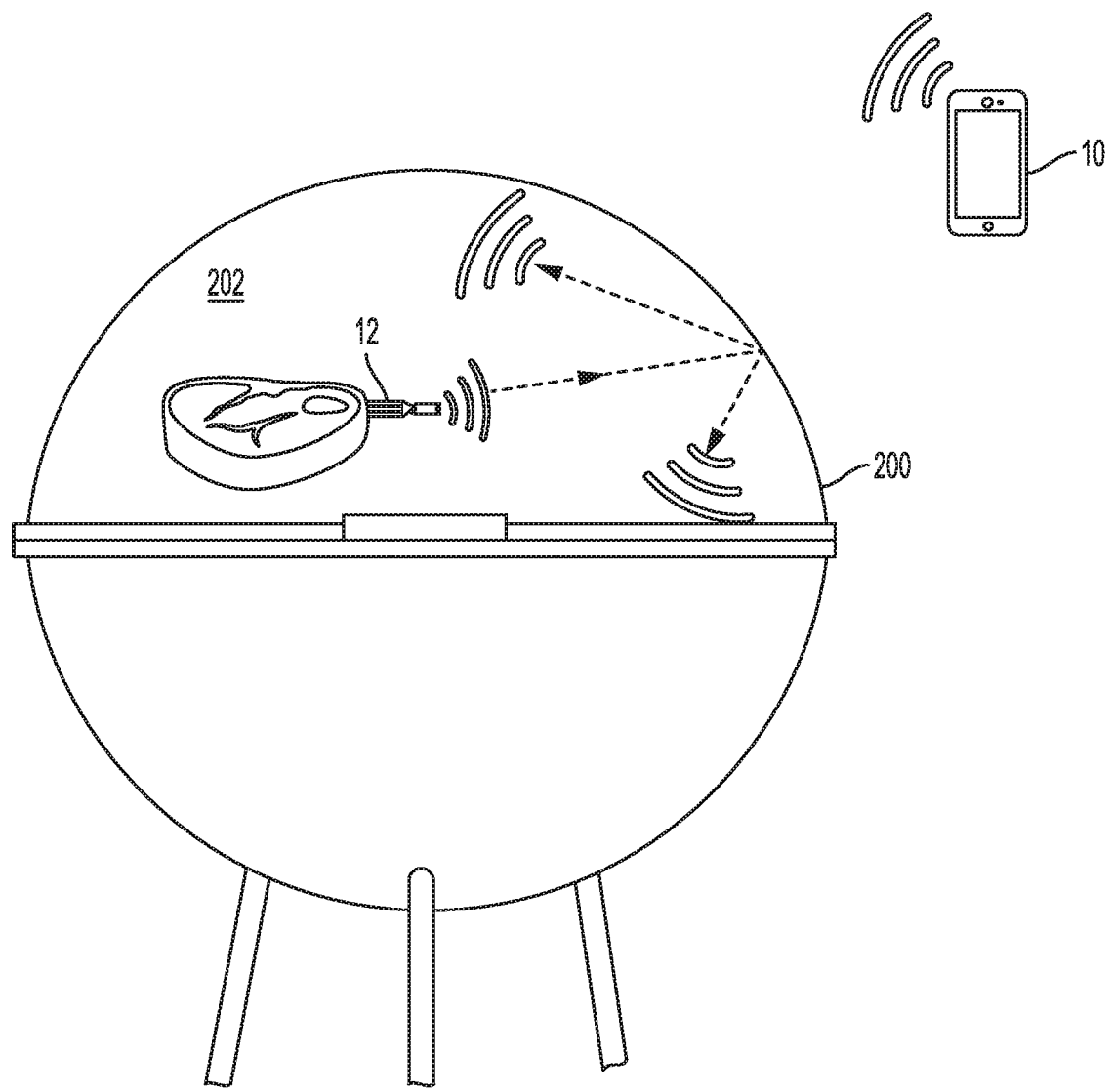
FIG. 2 illustrates the reflection of wireless signals inside of a cooking appliance.

However, as shown in FIG. 2, some or all of the wireless signal may be reflected back into cooking chamber 202 of cooking appliance 200 instead of passing through cooking appliance 200 to be received by remote device 10. In this regard, a signal radiates from wireless device 12 inside the cooking appliance (e.g., a wireless meat thermometer in the example of FIG. 2) and spreads in a three-dimensional space from an antenna of wireless device 12. Objects such as a metal cover or lid of cooking appliance 200 can disturb or interfere with radiation of the signal, thereby attenuating the wireless signal. The wireless signal generally cannot pass through a metal wall of cooking appliance 200 or is at least partially blocked by the walls of cooking appliance 200.

Some slots, air vents, or other openings in cooking appliance 200 can allow for some of the signal to travel outside of cooking appliance 200, but these openings are typically relatively small compared to the overall internal surface area of cooking chamber 202. This can result in a much weaker or lower power wireless signal outside of cooking appliance 200 and may greatly reduce the communication range or the distance at which remote device 10 may need to be located in order to effectively receive the wireless signal from wireless device 12 inside cooking appliance 200.

Figure 3:
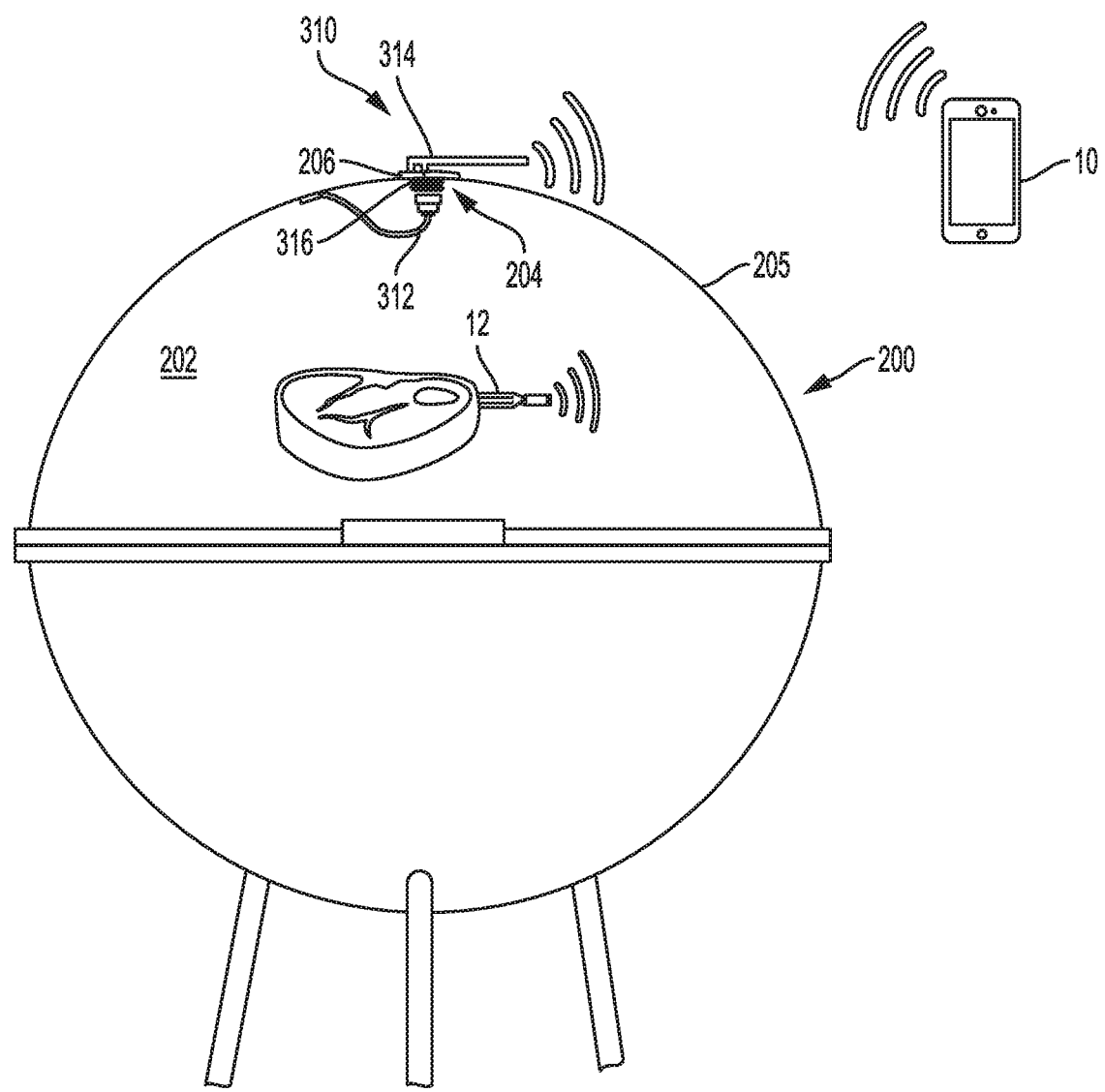
FIG. 3 illustrates a wireless signal repeater installed on or as part of a cooking appliance according to an embodiment.

FIG. 3 illustrates wireless signal repeater 310 installed on cooking appliance 200 according to an embodiment. As shown in FIG. 3, wireless signal repeater 310 includes exterior antenna 314 installed, located, or configured to be affixed on an exterior of cooking appliance 200, and interior antenna 312 installed, located, or configured to be affixed on an interior of cooking chamber 202 located inside cooking appliance 200.

Wireless signal repeater 310 also includes coupling portion 316 configured to connect interior antenna 312 with exterior antenna 314 through hole 206 of wall 205 of cooking appliance 200. Coupling portion 316 is configured to electrically transmit signals between interior antenna 312 and exterior antenna 314 for wirelessly retransmitting wireless signals received by wireless signal repeater 310.

For example, wireless signal repeater 310 may retransmit a wireless signal from a wireless food thermometer inside cooking chamber 202 for reception by remote device 10 outside of cooking appliance 200. In such an example, interior antenna 312 receives a wireless signal from the wireless food thermometer. Coupling portion 316 electrically transmits the received signal from interior antenna 312 to exterior antenna 314, which retransmits the wireless signal to remote device 10.

In other examples, this direction of this retransmission may be reversed, such that wireless signal repeater 310 retransmits a wireless signal from remote device 10 outside cooking appliance 200 for reception by a wireless food thermometer or other wireless device inside cooking chamber 202. In this case, exterior antenna 314 receives a wireless signal from remote device 10. Coupling portion 316 electrically transmits the received signal from exterior antenna 314 to interior antenna 312, which retransmits the wireless signal to the wireless device inside cooking chamber 202.

As shown in FIG. 3, coupling portion 316 is located at top portion 204 of cooking chamber 202. In the example of FIG. 3, a lid or cover of cooking appliance 200 has a parabolic or curved shape. Top portion 204 can include an area surrounding the vertex or apex of the curved shaped lid or cover of cooking appliance 200. This location for coupling portion 316 can ordinarily position interior antenna 312 at or near a focus for the parabolic or curved shape of the lid or cover of cooking apparatus 200. As a result, the reflected wireless signals from wireless device 12 within cooking chamber 202 tend to focus or intersect at or near at least a portion of interior antenna 312, thereby allowing interior antenna to receive more of the reflected wireless signal for retransmission by exterior antenna 314. This can result in a higher power signal being retransmitted by exterior antenna 314.

In some implementations, repeater device 310 can be a passive signal repeater that does not need to be internally powered. In such implementations, the energy provided by the wireless signal inside cooking chamber 202 is used to excite the wireless signal retransmitted by exterior antenna 314. Such passive implementations can ordinarily allow for higher temperature operating ranges since temperature sensitive components such as batteries can be avoided. The usable life of passive repeaters is also generally better than active repeaters, which may involve electrically active or other types of active components.

In other implementations, repeater device 310 may be internally powered or remotely powered by, for example, inductive charging to amplify the signal transmitted by exterior antenna 314. In some implementations, wireless signal repeater 310 can include a battery for storing an electrical charge, and an amplifier for amplifying the signal to be wirelessly retransmitted by wireless signal repeater 310. In either active or passive style repeaters, the mechanical durability or physical endurance of the wireless signal repeater can match that of other non-moving parts of cooking appliance 200.

By retransmitting a wireless signal received by interior antenna 312 to outside of cooking appliance 200, it is ordinarily possible to provide a stronger wireless signal to remote device 10 at a farther distance from cooking appliance 200. This can allow a user of remote device 10 to travel farther from cooking device 200 (e.g., away from a grill in the backyard and into the house) and still receive at remote device 10 the information transmitted from the wireless device inside cooking chamber 202.

In some implementations, wireless signal repeater 310, or one or more portions thereof, may be integrally formed as part of cooking appliance 200. In this regard, wireless signal repeater 310 may form part of cooking appliance 200 with wireless signal repeater 310 installed on cooking appliance 200 at the factory.

In other implementations, cooking appliance 200 may be retrofitted with wireless signal repeater 310 in the field or at a retail location after leaving the factory. In such implementations, hole 206 may result from a hole drilled through wall 205 or may result from the replacement or modification of an existing component of cooking appliance 200, such as the replacement or modification of a handle on the lid or cover of cooking appliance 200, the replacement or modification of a thermostat gauge on the lid or cover of cooking appliance 200, or the replacement or modification of a brand badge or nameplate on the lid or cover of cooking appliance 200. In other implementations, hole 206 may be a preexisting opening in the lid or cover of cooking appliance, such as an air vent that is used to insert coupling portion 316 of wireless signal repeater 310 in the field. Such an example is provided with reference to FIG. 10 discussed below.

As will be appreciated by those of ordinary skill in the art, other implementations of wireless signal repeater 310 may include a different arrangement of an interior antenna, an exterior antenna, and a coupling portion than shown in FIG. 3. For example, the shape of the antennas shown in FIG. 3 may vary, as in the examples shown in FIGS. 9, 10, and 11A to 11D discussed below, or the location of the wireless signal repeater can be in a different location, such as the location shown in FIG. 4, which is discussed in more detail below.

Figure 4:
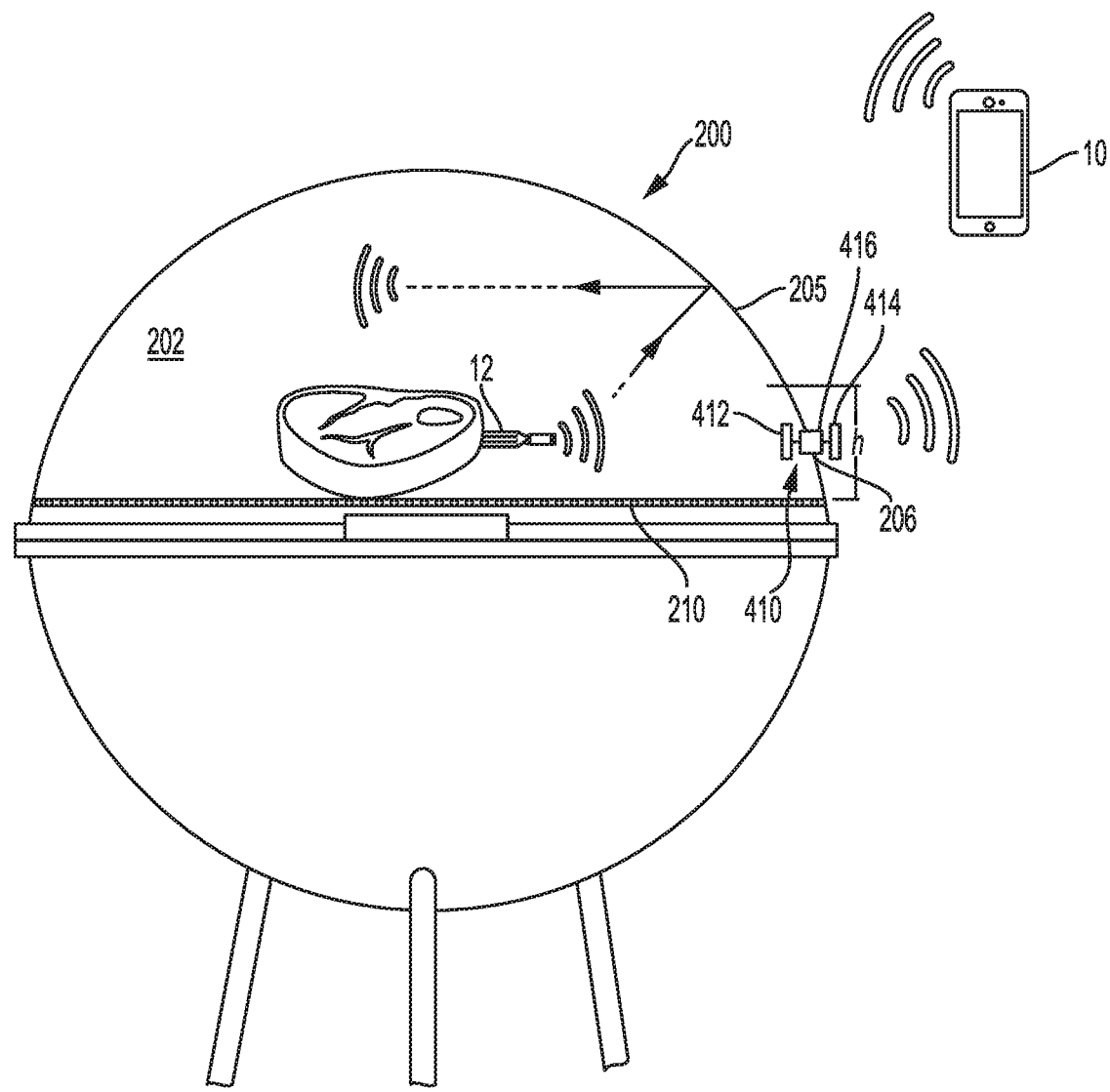
FIG. 4 illustrates the retransmission of a wireless signal outside of a cooking appliance using a wireless signal repeater according to an embodiment.

FIG. 4 illustrates the retransmission of a wireless signal outside of cooking appliance 200 using wireless signal repeater 410 according to an embodiment. As shown in FIG. 4, even when part of the wireless signal reflects back into cooking chamber 202 of cooking appliance 200, another part of the wireless signal is still received by interior antenna 412 of wireless signal repeater 412 for retransmission by exterior antenna 414 of wireless signal repeater 412. Retransmission of even part of the wireless signal to outside cooking appliance 200 can significantly improve the signal strength (i.e., power) and communication range or distance of the wireless signal. In some examples, the use of wireless signal repeater 310 in FIG. 3 or wireless signal repeater 410 in FIG. 4 approximately doubles the range of the wireless signal from wireless device 12 outside of cooking appliance 200.

In addition, and as noted above, the retransmission of wireless signals may be bidirectional in that wireless signal repeater 412 may be used to receive wireless signals from one or more remote devices (e.g., remote device 10 in FIG. 4) and retransmit the wireless signals inside cooking chamber 202 to wireless device 12. Such bidirectional communication may also be required by some wireless communication protocols, such as Bluetooth.

As shown in FIG. 4, interior antenna 412 is electrically connected with exterior antenna 414 through coupling portion 416, which penetrates through wall 205 of cooking appliance 200. In the example of FIG. 4, wireless signal repeater 410 is located within a height h from cooking grate 210. The height h in FIG. 4 generally corresponds to an expected maximum or average height for placement of wireless device 12. For example, when wireless device 12 is a food thermometer, h may correspond to approximately 2 inches to correspond to an expected maximum height location for wireless device 12 when inserted into food being cooked on cooking grate 210. This location can allow for more of the wireless signal to be received by interior antenna 412 for retransmission by exterior antenna 414 when wireless device 12 is placed near interior antenna 412.

Figure 5A:
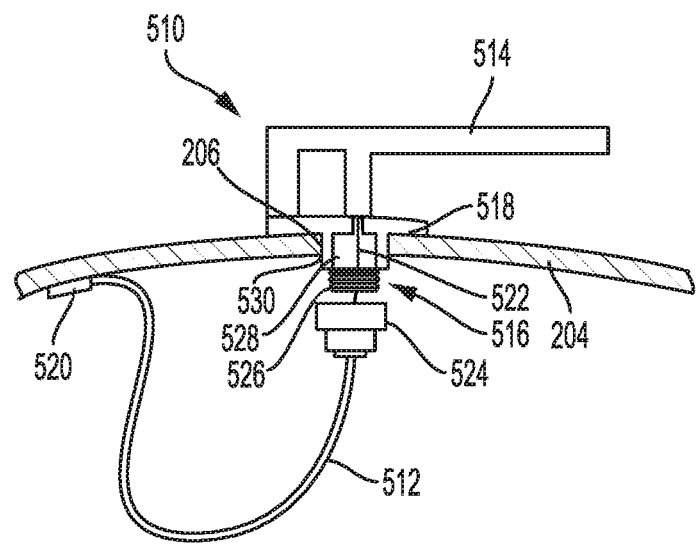
FIG. 5A is a side view of a wireless signal repeater installed on a cooking appliance according to an embodiment.

FIG. 5A is a side view of wireless signal repeater 510 installed on cooking appliance 200 according to an embodiment. As shown in the example of FIG. 5A, exterior antenna 514 of wireless signal repeater 510 has an Inverted F Antenna (IFA) design with a monopole antenna parallel to a ground plane. In more detail, exterior antenna 514 is grounded at one end to metal wall 205 of cooking appliance 200 via mounting plate 518.

Figure 5B:
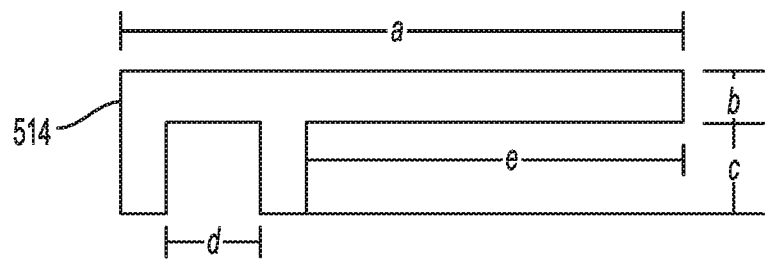
FIG. 5B is a side view of an exterior antenna of the wireless signal repeater of FIG. 5A according to an embodiment.

FIG. 5B is a side view of exterior antenna 514 of wireless signal repeater 510 according to an embodiment. The dimensions of exterior antenna 514 may be sized for a particular frequency and/or wavelength. For example, dimensions a, b, c, d, and e in FIG. 5B may be selected for transmitting and receiving wireless signals at approximately 2.4 GHz for Bluetooth signals. In such an example, dimensions a, b, c, d, and e may correspond to approximately 30 mm, 3 mm, 7 mm, 5 mm, and 19.2 mm, respectively. In other implementations, the exterior antenna may include a different design, including a dipole antenna, a wideband dipole antenna, a type of monopole antenna, a bow-tie antenna, a helical antenna, a corner antenna, or a patch antenna, such as a planar inverted-F antenna or other planar antenna. In some implementations, the exterior antenna may include, for example, a dipole antenna with particular dimensions for transmitting and/or receiving wireless signals of a particular wavelength and/or frequency.

Returning to FIG. 5A, wireless signal repeater 510 includes coupling portion 516, which penetrates through hole 205 of wall 205 of cooking appliance 200. In the example of FIG. 5A, coupling portion 516 includes mounting portion 518 for mounting exterior antenna 514 onto an exterior of cooking appliance 200, and an interior antenna attachment portion 526 for attaching interior antenna 512 to coupling portion 516. Attachment portion 526 in the example of FIG. 5A includes threads for screwing internal antenna 512 onto coupling portion 516, but other implementations may include different methods of attaching or affixing interior antenna to coupling portion 516.

Wire 522 electrically connects exterior antenna 514 with interior antenna 512 through coupling portion 516. Wire 522 can include, for example, a 50 Ohm connector or a particular heat resistant connector or signal transmission line. In the example of FIG. 5A, coupling portion 516 includes outer shell 530 that surrounds wire 522. An air gap or other dielectric fills space 528 inside outer shell 530 to provide both temperature insulation and electrical insulation for wire 522.

Figure 5C:
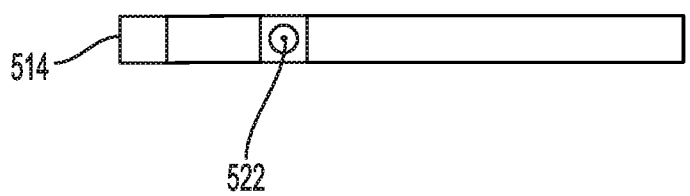
FIG. 5C is a bottom view of the exterior antenna of FIG. 5B according to an embodiment.

FIG. 5C provides a bottom view of exterior antenna 514 according to an embodiment. As shown in FIG. 5C, wire 522 connects to a bottom prong of the IFA exterior antenna 514. A smaller insulation gap may be provided through mounting portion 518 of coupling portion 516 for wire 522 to connect to the bottom prong of exterior antenna 514.

As shown in the example of FIG. 5A, interior antenna 512 may have a looped design that dips or hooks downward into an internal cooking chamber of cooking appliance 200 before looping back up to contact wall 205 of the cooking chamber, which may serve as a ground for the interior antenna. Grounding contact 520 can include a metal connection between internal antenna 512 and wall 205. In some implementations, internal antenna 512 may be welded, brazed, or screwed to wall 205.

In the example of FIG. 5A, the interior antenna can include a magnetic loop antenna, which ordinarily performs well inside cooking chambers that are relatively small metal enclosures. In other implementations, the interior antenna can include an electric field antenna (such as the square shaped interior antenna 912 shown in FIG. 9), which also performs well inside of small metal cooking chambers. In FIG. 5, end portion 524 of interior antenna 512 is screwed onto attachment portion 526 of coupling portion 516. In other implementations, the interior antenna can include, for example, a different design, including a dipole antenna, a wideband dipole antenna, type of monopole antenna, bow-tie antenna, helical antenna, corner antenna, or a patch antenna, such as a planar inverted-F antenna or other planar antenna.

As discussed in more detail below with reference to the helical antenna of FIG. 11B, in cases where the interior antenna is a helical antenna, the circular polarization of the helical antenna reduces the sensitivity of the interior antenna to the polarization of wireless device 12 inside cooking chamber 202. In addition, the helical antenna may use the interior surface of cooking chamber 202 as a reflector.

As discussed in more detail below with reference to FIGS. 11C and 11D, in cases where the interior antenna is a bow-tie antenna or a wide dipole antenna, the additional bandwidth provided by such broadband antenna designs can allow for a wider manufacturing tolerance in the antenna and/or can allow for a greater degree of structural changes to take place over time in the antenna or in other components in cooking chamber 200 due to environmental conditions. As a result, small changes in the shape of the antenna due to manufacturing variances or due to high temperatures will not significantly affect the efficiency of the reception and retransmission of wireless signals at a particular frequency, such as at a Bluetooth frequency of approximately 2.4 GHz.

In some implementations, the wireless signal repeater may also provide for signal coupling using a magnetic field that uses a shorted connection to ground. In other implementations, signal coupling may be accomplished using a capacitive probe.

As will be appreciated by those of ordinary skill in the art, other antenna designs or components, or locations for the interior and/or exterior antennas are possible in different implementations.

For example, the interior antenna design and/or location can also consider the expected location or locations of the wireless device inside the cooking chamber, as discussed above with reference to the example of FIG. 4. In one example, a wireless meat thermometer in a grill may most often be inserted into meat horizontally. This can provide likely or expected locations for an antenna of the wireless meat thermometer at a horizontal location slightly above (e.g., half an inch) above a cooking grate where the meat will cook. The location of the interior antenna may be placed for better signal reception from this position and in light of the geometry of the interior of the cooking chamber.

As another example, the interior antenna may be located at a top portion of a curved cooking chamber lid so that the interior antenna will be located relatively close to any expected position of the wireless device inside the cooking chamber. In some examples, an interior surface of the cooking chamber can also act as a signal reflector to improve signal reception by the interior antenna, as discussed above with reference to the example of FIG. 3. The location and design of the interior antenna may also consider a particular antenna design for the wireless device expected to be used inside the cooking appliance.

Similarly, the exterior antenna may be located so as to improve the broadcast or transmission of the wireless signal from the exterior antenna in consideration of possible obstructions near, or on the exterior of the cooking appliance, or based on remote devices expected to be used with the wireless signal repeater.

In the example of FIGS. 5A to 5C, wireless signal repeater 510 may be installed to retrofit a cooking appliance in the field or at a retail location, such as by drilling a hole through a cover of the cooking appliance and screwing the exterior and interior antennas together with a threaded coupling portion. In other examples, the wireless signal repeater may replace an existing thermometer gauge in a wall of the cooking appliance or fit into another existing opening in a wall of the cooking appliance, such as an air vent hole. One retrofit example may include a replacement handle, which can include at least a portion of the wireless signal repeater, such as the exterior antenna. Yet other examples for retrofitting a cooking appliance with a wireless signal repeater can include a wireless signal repeater that includes at least one magnet to affix the exterior antenna to the exterior surface of the cooking appliance and/or to affix the interior antenna to the interior surface of the cooking chamber. Other methods of mounting the wireless signal repeater to the cooking appliance may be used in other examples.

In some implementations, the wireless signal repeater can be initially included as part of the cooking appliance by the manufacturer. In such implementations, the wireless signal repeater may, for example, be located near or form part of a lid or door handle, a heatshield for a handle, or a brand badge or nameplate. The size and location of the exterior antenna can be such that it has a relatively small effect on the overall appearance or aesthetics of the cooking appliance. In some cases, the wireless signal repeater can be formed as part of a metal stamping or casting process such that additional parts may not be required to construct the wireless signal repeater or portions thereof.

Figure 6A:
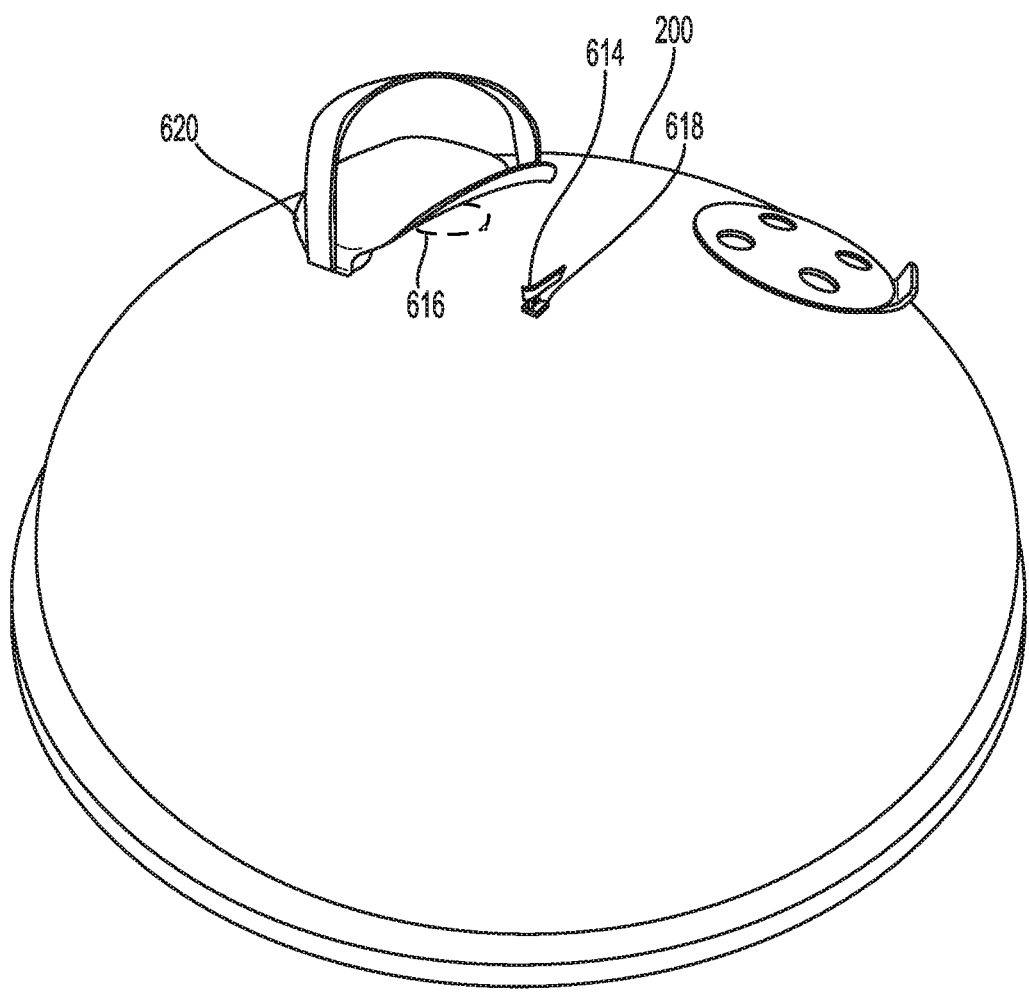
FIG. 6A is a view of a cooking appliance showing an exterior antenna installed on an exterior of a cooking appliance according to an embodiment.
Figure 7:
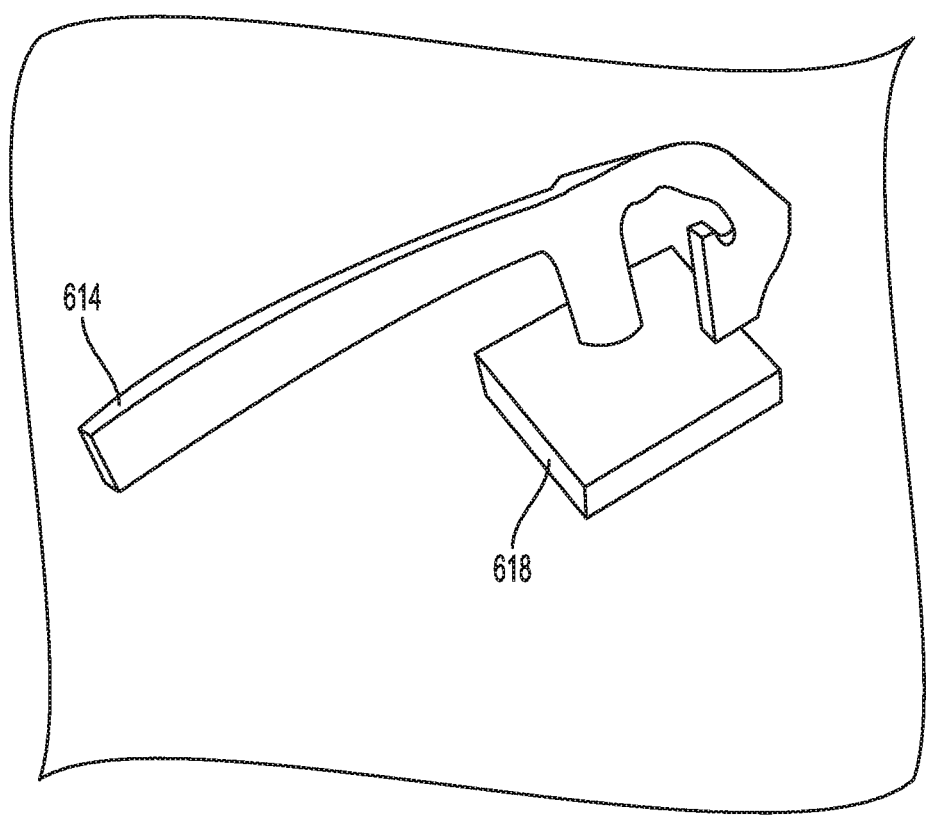
FIG. 7 is a close-up view of the exterior antenna of FIG. 6A.

FIG. 6A is an exterior view of cooking appliance 200 showing exterior antenna 614 installed on an exterior of cooking appliance 200. As shown in FIG. 6A, exterior antenna 614 is mounted on mounting portion 618, which both take up a relatively small area of the exterior of cooking appliance 200. Exterior antenna 614 has an IFA design similar to that of exterior antenna 514 in FIG. 5, but also includes more of a curved design than exterior antenna 514. FIG. 7 provides a close-up view of exterior antenna 614 from FIG. 6A.

As shown in FIG. 6A, the lid or cover of cooking appliance 200 can optionally include an aperture at location 616 under reflector 620, which is beneath a handle for the lid or cover. In such an implementation, reflector 620 is mounted over the aperture and can have a dual purpose as a heat shield for the handle, and as a reflector for reflecting wireless signals from inside cooking appliance 200 in a more horizontal direction to improve the strength or energy of the wireless signals in locations where remote device 10 is more likely to be located. In other words, reflector 620 or another type of reflector, such as a dedicated reflector, can be positioned or mounted over location 616 so that portions or energy from the wireless signal passing through an aperture at location 616 is redirected from a vertical or skyward direction above cooking appliance 200 toward a more horizontal direction from cooking appliance 200. In this regard, reflector 620 may narrow the radiation pattern of wireless signals emitted through the aperture. The aperture may also serve other functions for cooking appliance 200, such as by providing an air vent in a grill or a chimney tube in a smoker.

In other implementations, location 616 may be an alternate location for exterior antenna 614, such that reflector 620 reflects a wireless signal transmitted by exterior antenna 614 to direct the wireless signal along a more horizontal direction or otherwise narrow the radiation pattern of the wireless signal. As noted above, this can ordinarily provide for a stronger signal in areas where remote device 10 is expected to located by redirecting portions of the wireless signal that would ordinarily be transmitted more directly above the grill. In this regard, the combination of reflector 620 and exterior antenna 614 when located within location 616 acts as a high gain or directional antenna.

In yet other implementations, cooking appliance 200 may use both a wireless signal repeater and an aperture at location 616 with reflector 620. Such an implementation provides multiple points of wireless signal transmission from cooking appliance 200 and multiple point of wireless signal reception into cooking appliance 200. In the example of FIG. 6A, a first point of transmission and reception is provided by exterior antenna 614, and a second point of transmission and reception is provided by an aperture at location 616.

Figure 6B:
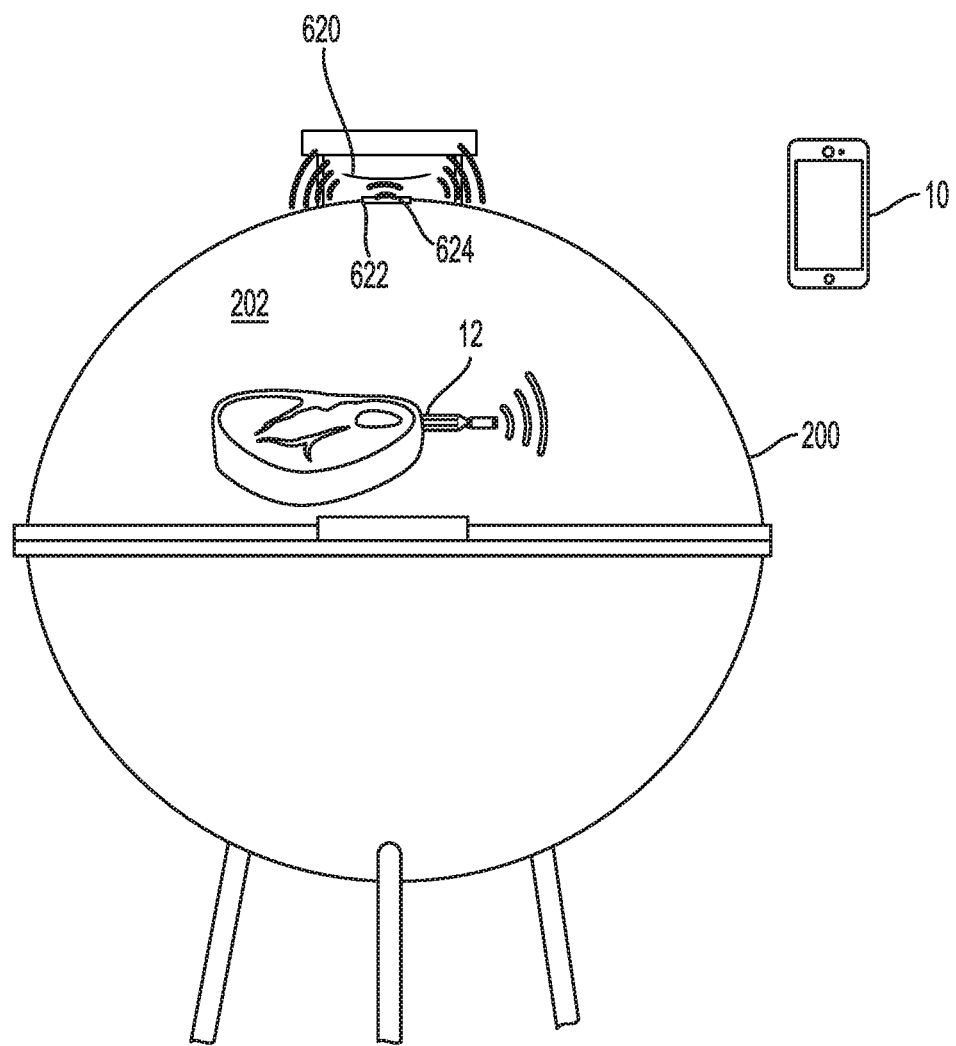
FIG. 6B is a side view of a cooking appliance with an aperture and a reflector for narrowing a radiation pattern according to an embodiment.

In some implementations, reflector 620 may form part of a corner antenna between reflector 620 and an exterior surface of cooking appliance, such that wireless signals emitted from an aperture or an exterior antenna within location 616 are directed in a particular direction away from cooking appliance 200. FIG. 6B provides a side view of such an implementation where cooking appliance 200 includes aperture 622 and reflector 620 mounted over aperture 622 for narrowing a radiation pattern according to an embodiment.

In the example of FIG. 6B, dielectric material 624 is affixed inside of aperture 622 to allow for a reduction in the size of aperture 622 for a given wavelength. Dielectric material 624 may include, for example, a material such as glass, ceramic, or an air gap between such dielectric materials. Dielectric material 624 may also serve other functions, such as by retaining heat inside cooking chamber 202, while allowing wireless signals to travel through dielectric material 624.

As shown in FIG. 6B, wireless signals from wireless device 12 inside cooking chamber 202 pass through dielectric material 624 and aperture 622 before being reflected or narrowed by the space between reflector 620 and the exterior surface of cooking appliance 200. In addition, wireless signals transmitted from remote device 10 are similarly narrowed by the space between reflector 620 and the exterior surface of cooking appliance 200 so as to focus or redirect the wireless signals into aperture 622 via dielectric material 624.

Figure 8:
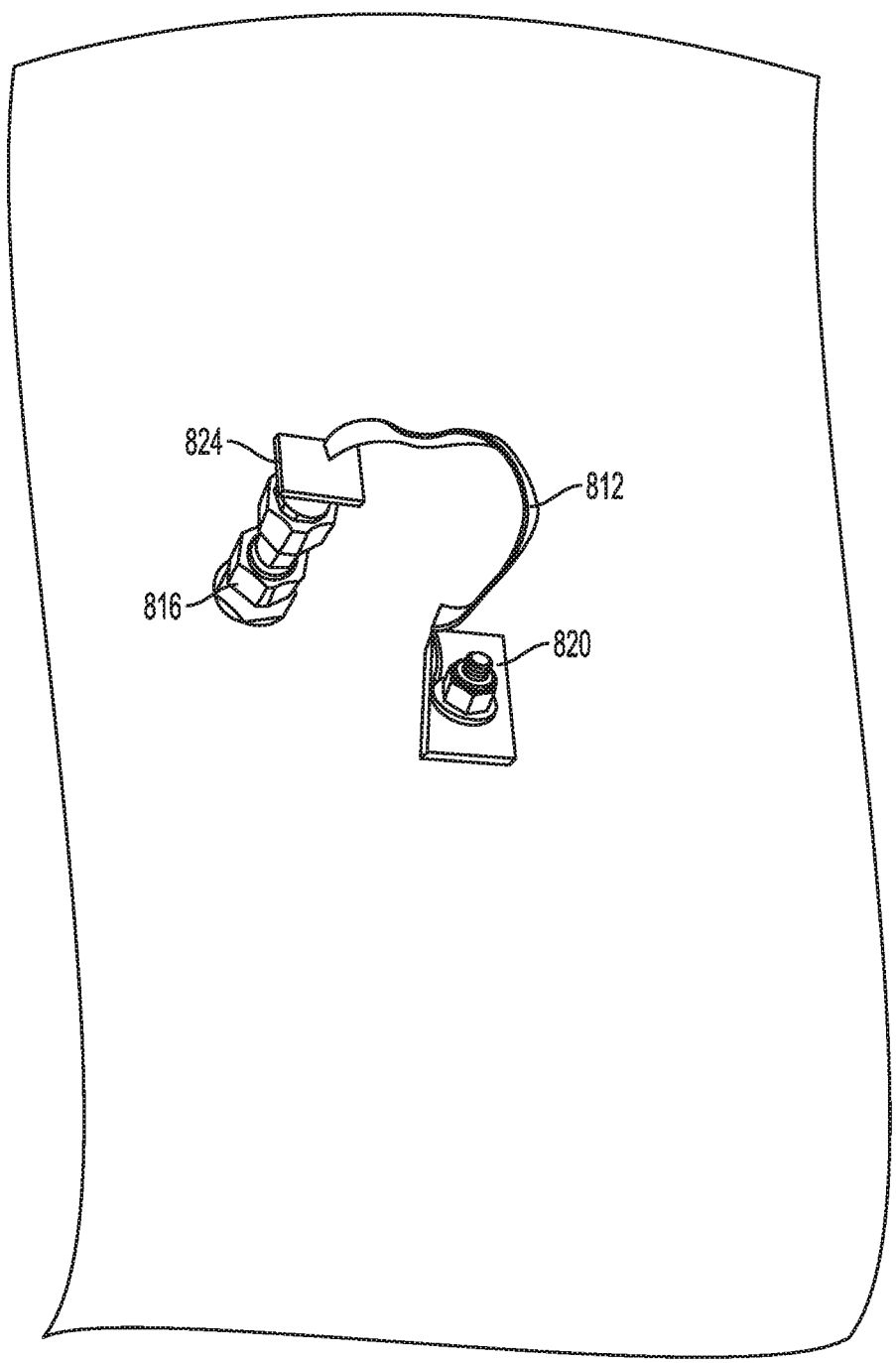
FIG. 8 is a close-up view of an interior antenna installed on a lid of a cooking appliance according to an embodiment.

FIG. 8 provides a close-up view of interior antenna 812 installed on a cover of a cooking appliance. As shown in FIG. 8, interior antenna 812 forms a magnetic loop with the lid of the cooking appliance with grounding at one end of interior antenna 812 at grounding portion 820, and a connection to coupling portion 816 at end portion 824 of interior antenna 812. Similar to the examples discussed above with reference to FIGS. 3 to 5A, coupling portion 816 in FIG. 8 electrically connects interior antenna 812 to an exterior antenna on the exterior of the cooking appliance.

Although grounding portion 820 is shown in FIG. 8 as a being a metal contact plate on the interior surface of a cooking chamber, other implementations may instead affix interior antenna 812 directly onto the interior wall of the cooking chamber. Interior antenna 812 may be affixed using a screw and nut, as shown in FIG. 8, or may be affixed using a different method such as by welding or brazing.

Figure 9:
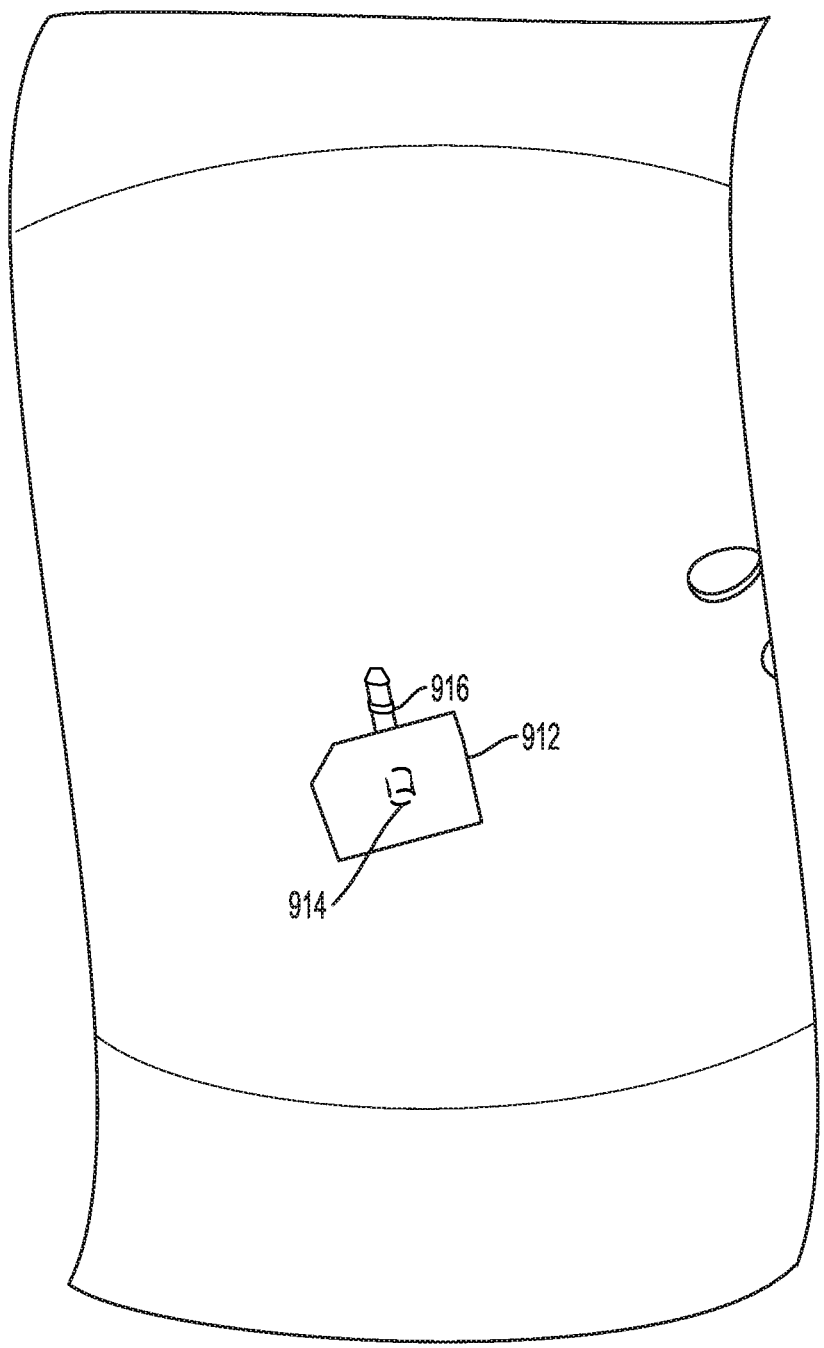
FIG. 9 is a view of an interior antenna installed on a cover of a cooking appliance according to an embodiment.

FIG. 9 is a view of interior antenna 912 installed on a cover of a cooking appliance according to an embodiment. In the example of FIG. 9, interior antenna 912 is connected to coupling portion 916, and is an electric field antenna with a flat plate design that has a relatively square shape. As noted above, such electric field antennas can perform well inside of small metal enclosures in terms of receiving and transmitting wireless signals to a wireless device inside the metal enclosure.

In some implementations, interior antenna 912 may be a high gain antenna or a directional antenna that reflects and collects wireless signals in a direction toward an expected location of wireless device 12, such as toward a cooking grate of cooking appliance 200. As shown in FIG. 9, interior antenna 912 may optionally include feeder line 914 that uses the flat surface of interior antenna 912 behind feeder line 914 as a reflector to redirect wireless signals emitted from feeder line 914, or redirect received wireless signals toward feeder line 912. In other implementations, the flat surface of interior antenna 912 serving as a reflector may be bent along its center to form a 90 degree or 60 degree angle, for example, such that interior antenna 912 is a corner antenna directed toward a cooking grate below interior antenna 912. An example of a corner antenna is discussed in more detail below with reference to FIG. 11A.

Figure 10:
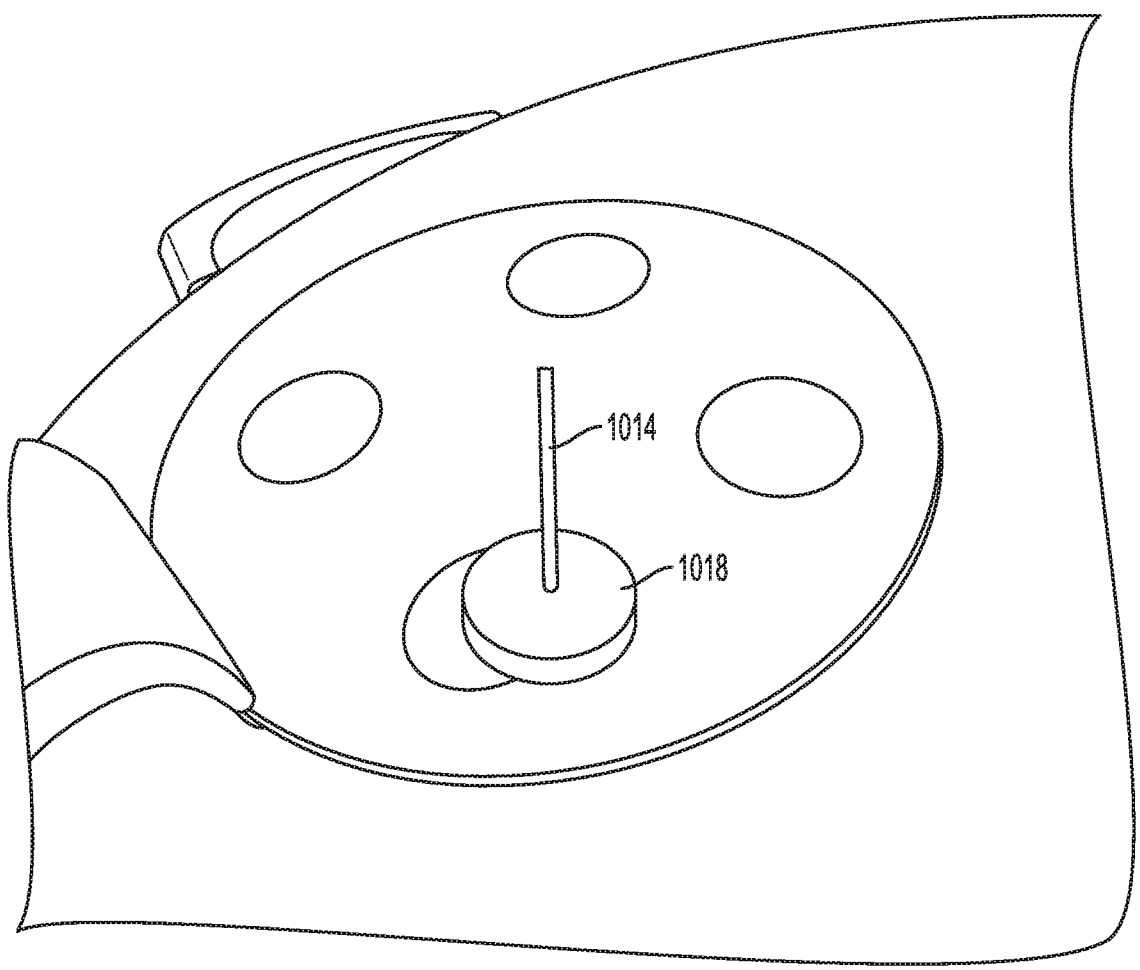
FIG. 10 is an exterior view of a cooking appliance showing an exterior antenna according to an embodiment.

FIG. 10 is an exterior view of a cooking appliance showing exterior antenna 1014 as a monopole antenna according to an embodiment. In the example of FIG. 10, exterior antenna 1014 has been retrofitted or installed through an existing air vent of the cooking appliance using magnet 1018 as a mounting portion. Exterior antenna 1018 of FIG. 10 is mounted perpendicular to the metal cover of the cooking appliance, which may serve as a ground plane.

Figure 11A:
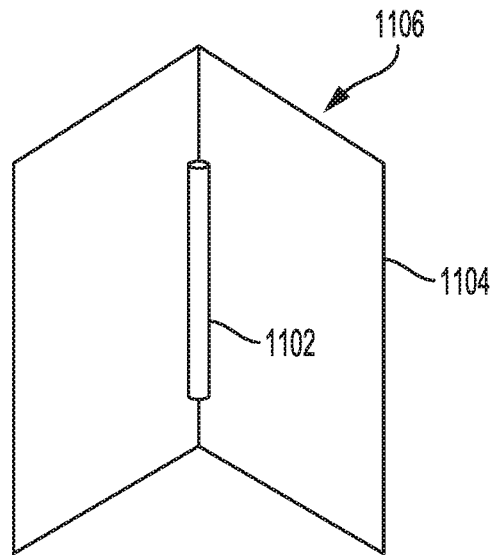
FIG. 11A is a view of a corner antenna of a wireless signal repeater according to an embodiment.

FIG. 11A is a view of corner antenna 1106 of a wireless signal repeater according to an embodiment. Corner antenna 1106 may be used as an interior antenna inside cooking chamber 202 and/or as an exterior antenna outside of, or on an exterior of cooking appliance 200. Corner antenna 1106 is a type of directional antenna that can be used to receive or radiate power in a direction of a cooking grate inside cooking chamber 202 when used as an interior antenna, or in a particular direction outside of cooking appliance 200 when used as an exterior antenna. As shown in FIG. 11A, corner antenna 1106 includes reflector 1104 and feed line 1102 positioned a distance from reflector 1104. Wireless signals retransmitted by feed line 1102 are reflected or redirected away from corner reflector 1104.

In the example of FIG. 11A, corner reflector 1104 is shown as having a 90 degree angle. However, corner reflector 1104 in other implementations can have a different angle depending on the geometry of cooking chamber 202 to direct more of the wireless signal toward the cooking grate or to receive more of the wireless signal from wireless device 12 located near the cooking grate. For example, other implementations may include a corner reflector with a 60 degree bend. In yet other implementations, corner reflector 1106 may be a flat plate without a bend.

Figure 11B:
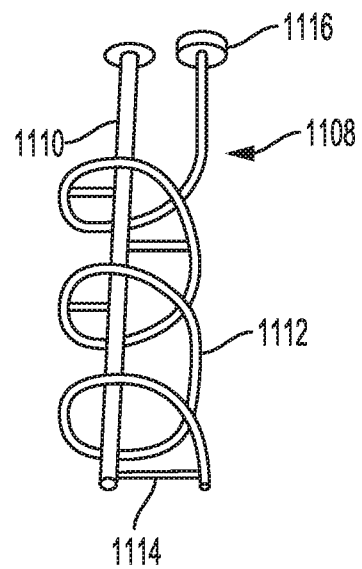
FIG. 11B is a view of a helical antenna of a wireless signal repeater according to an embodiment.

FIG. 11B is a view of helical antenna 1108 of a wireless signal repeater according to an embodiment. Helical antenna 1108 may be used as an interior antenna inside cooking chamber 202 and/or as an exterior antenna outside of or on an exterior of cooking appliance 200. Helical antenna 1108 is a type of directional antenna that can be used to receive or radiate power in a direction of a cooking grate inside cooking chamber 202 when used as an interior antenna, or in a particular direction outside of cooking appliance 200 when used as an exterior antenna.

As shown in FIG. 11B, helical antenna 1108 includes helical wire 1112 for receiving or transmitting wireless signals in a direction along central support 1110. Helical wire 1112 connects to coupling portion 1116 to electrically connect helical antenna 1108 to the other antenna of the wireless signal repeater. Helical antenna 1108 may include insulating supports 1114 as shown in FIG. 11B for stabilizing the location of helical wire 1112 about central support 1110. In some implementations, a metal wall of cooking appliance 200 may serve as a reflector ground plane for helical antenna 1108.

The circular polarization of helical antenna 1108 due to the helical corkscrew shape of helical wire 1112 ordinarily reduces a sensitivity of helical antenna to the polarization of a wireless device, such as a wireless food thermometer inside cooking chamber 202. In addition, helical antenna 1108 can have a relatively wide bandwidth due to its design. This can allow for a wider tolerance in manufacturing the antenna and can better allow for structural changes due to temperature changes in cooking appliance 200, while still being an efficient receiver or transmitter for a particular frequency of wireless signals.

Figure 11C:
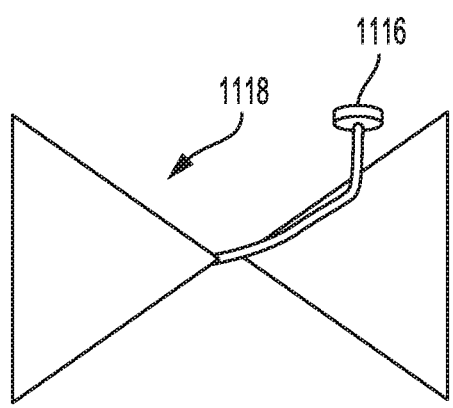
FIG. 11C is a view of a bow-tie antenna of a wireless signal repeater according to an embodiment.

FIG. 11C is a view of bow-tie antenna 1118 of a wireless signal repeater according to an embodiment. As a broadband or wide bandwidth antenna, bow-tie antenna 1118 can similarly allow for a wider variance of dimensions when manufacturing bow-tie antenna 1118 and can allow for more dimensional changes of bow-tie antenna 1118 over a period of use in cooking appliance 200. As shown in FIG. 11C, bow-tie antenna 1118 connects to coupling portion 1116 to electrically connect bow-tie antenna 1118 to the other antenna of the wireless signal repeater. As with the antennas of FIGS. 11A and 11B discussed above, bow-tie antenna 1118 in FIG. 11C may be the interior antenna or the exterior antenna of the wireless signal repeater. In addition, bow-tie antenna 1118 may use a metal wall of cooking appliance 200 as a ground for the antenna.

Figure 11D:
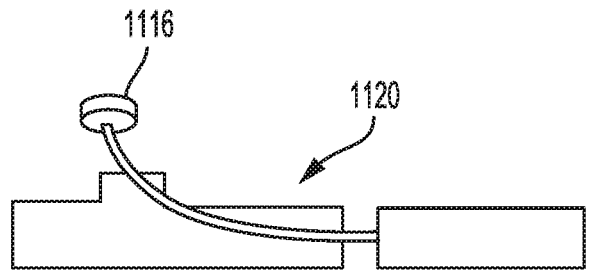
FIG. 11D is a view of a wide dipole antenna of a wireless signal repeater according to an embodiment.

FIG. 11D is a view of wide dipole antenna 1120 of a wireless signal repeater according to an embodiment. As with bow-tie antenna 1118 of FIG. 11C, wide dipole antenna 1120 provides a wider bandwidth that can allow for a wider tolerance of antenna dimensions that may result from manufacturing variations or can allow for some changes in the dimensions of wide dipole antenna 1120 due to environmental conditions of cooking appliance 200. In the example of FIG. 11D, wide dipole antenna 1120 connects to coupling portion 1116 to electrically connect wide dipole antenna 1120 to the other antenna of the wireless signal repeater. As with the antennas of FIGS. 11A and 11C discussed above, wide dipole antenna 1120 in FIG. 11D may be the interior antenna or the exterior antenna of the wireless signal repeater. In addition, wide dipole antenna 1120 may use a metal wall of cooking appliance 200 as a ground for the antenna.

As discussed above, the foregoing examples of wireless signal repeaters, apertures, and/or reflectors ordinarily improve the signal strength and range for wireless devices located inside a cooking appliance, such as those in an oven, grill, or smoker. This can allow a remote device communicating with the wireless device inside the cooking appliance to be located farther from the cooking appliance while still communicating with the wireless device inside the cooking appliance.

Other Embodiments

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive, and the scope of the disclosure is, therefore, indicated by the following claims rather than by the foregoing description. All changes which come within the meaning and range of equivalency of the claims are to be embraced within their scope.

What is claimed is:

1. A wireless signal repeater for use with a cooking appliance, the wireless signal repeater comprising:
   an interior antenna configured to be located in an interior of the cooking appliance;
   an exterior antenna configured to be located outside the cooking appliance; and
   a coupling portion configured to connect the interior antenna to the exterior antenna through a hole in a wall of the cooking appliance for wirelessly retransmitting wireless signals received by the wireless signal repeater, wherein the coupling portion includes an outer shell that surrounds a wire electrically connecting the exterior antenna and the interior antenna.

2. The wireless signal repeater of claim 1, wherein the wireless signal repeater is further configured to retransmit a wireless signal received from a wireless food thermometer inside a cooking chamber of the cooking appliance for reception by a remote device outside of the cooking appliance.

3. The wireless signal repeater of claim 1, wherein at least one of the interior antenna and the exterior antenna is a directional antenna configured to receive or radiate power in a direction of a cooking grate inside the cooking appliance or in a more horizontal direction outside of the cooking appliance with respect to a surface upon which the cooking appliance rests.

4. The wireless signal repeater of claim 1, wherein the wall of the cooking appliance serves as a ground plane for the exterior antenna.

5. The wireless signal repeater of claim 1, wherein the wire is surrounded by a dielectric inside the outer shell for temperature insulation and electrical insulation.

6. The wireless signal repeater of claim 1, wherein the interior antenna includes a magnetic loop antenna, an electric field antenna, a corner antenna, a helical antenna, a bow-tie antenna, a patch antenna, a dipole antenna, a monopole antenna, or a wide dipole antenna.

7. The wireless signal repeater of claim 1, wherein the exterior antenna includes an inverted F antenna, a corner antenna, a helical antenna, a bow-tie antenna, a patch antenna, a dipole antenna, a monopole antenna, or a wide dipole antenna.

8. The wireless signal repeater of claim 1, wherein at least a part of the wireless signal repeater is integrally formed as part of the cooking appliance.

9. The wireless signal repeater of claim 1, wherein at least a portion of the wireless signal repeater is located in or replaces a handle of the cooking appliance on an exterior of the cooking appliance, a nameplate of the cooking appliance, or a thermometer gauge of the cooking appliance.

10. The wireless signal repeater of claim 1, further comprising at least one magnet for affixing at least one of the exterior antenna and the interior antenna to the cooking appliance.

11. The wireless signal repeater of claim 1, wherein the interior antenna is located within an expected maximum height from a cooking grate for placement of a wireless device inside a cooking chamber of the cooking appliance.

12. The wireless signal repeater of claim 1, wherein the coupling portion is located at a top portion of a cooking chamber of the cooking appliance.

13. The wireless signal repeater of claim 1, further comprising a reflector located over the exterior antenna for redirecting wireless signals to or from the exterior antenna.

14. A cooking appliance, comprising:
    a cooking chamber for cooking food;
    an interior antenna located inside the cooking chamber;
    an exterior antenna mounted on an exterior surface of the cooking chamber; and
    a coupling portion configured to connect the interior antenna with the exterior antenna, wherein the coupling portion is further configured to electrically transmit signals between the interior antenna and the exterior antenna, and wherein the coupling portion includes an outer shell that surrounds a wire electrically connecting the exterior antenna and the interior antenna.

15. The cooking appliance of claim 14, wherein the exterior antenna is configured to retransmit a wireless signal received by the interior antenna from a wireless food thermometer inside the cooking chamber for reception by a remote device outside of the cooking appliance.

16. The cooking appliance of claim 14, wherein at least one of the interior antenna and the exterior antenna is a directional antenna configured to receive or radiate power in a direction of a cooking grate inside the cooking chamber or in a more horizontal direction outside of the cooking appliance with respect to a surface upon which the cooking appliance rests.

17. The cooking appliance of claim 14, wherein an exterior surface of the cooking appliance serves as a ground plane for the exterior antenna.

18. The cooking appliance of claim 14, wherein the wire is surrounded by a dielectric inside the outer shell for temperature insulation and electrical insulation.

19. The cooking appliance of claim 14, wherein the interior antenna includes a magnetic loop antenna, an electric field antenna, a corner antenna, a helical antenna, a bow-tie antenna, a patch antenna, a dipole antenna, a monopole antenna, or a wide dipole antenna.

20. The cooking appliance of claim 14, wherein the exterior antenna includes an inverted F antenna, a corner antenna, a helical antenna, a bow-tie antenna, a patch antenna, a dipole antenna, a monopole antenna, or a wide dipole antenna.

21. The cooking appliance of claim 14, wherein at least one of the exterior antenna, the coupling portion, and the interior antenna is integrally formed as part of the cooking appliance.

22. The cooking appliance of claim 14, wherein at least a portion of the exterior antenna or the coupling portion is located in or replaces a handle of the cooking appliance on an exterior of the cooking appliance, a nameplate of the cooking appliance, or a thermometer gauge of the cooking appliance.

23. The cooking appliance of claim 14, further comprising at least one magnet for affixing at least one of the exterior antenna to the exterior surface of the cooking appliance and affixing the interior antenna to the interior surface of the cooking chamber.

24. The cooking appliance of claim 14, further comprising a cooking grate inside the cooking chamber, and wherein the interior antenna is located within an expected maximum height from the cooking grate for placement of a wireless device inside the cooking chamber.

25. The cooking appliance of claim 14, further comprising:
   a cooking grate inside the cooking chamber; and
   a lid configured to reflect wireless signals from the interior antenna toward the cooking grate or from a wireless device inserted into food on the cooking grate toward the interior antenna.

26. The cooking appliance of claim 14, further comprising:
   an aperture in a wall of the cooking appliance exposing the cooking chamber to outside the cooking appliance; and
   a reflector located over the aperture configured to narrow a radiation pattern of wireless signals transmitted through the aperture.

27. A wireless signal repeater for use with a cooking appliance, the wireless signal repeater comprising:
   an interior antenna configured to be located in an interior of the cooking appliance;
   an exterior antenna configured to be located outside the cooking appliance;
   at least one magnet for affixing at least one of the exterior antenna and the interior antenna to the cooking appliance; and
   a coupling portion configured to connect the interior antenna to the exterior antenna through a hole in a wall of the cooking appliance for wirelessly retransmitting wireless signals received by the wireless signal repeater.

28. A wireless signal repeater for use with a cooking appliance, the wireless signal repeater comprising:
   an interior antenna configured to be located in an interior of the cooking appliance;
   an exterior antenna configured to be located outside the cooking appliance;
   a reflector located over the exterior antenna for redirecting wireless signals to or from the exterior antenna; and
   a coupling portion configured to connect the interior antenna to the exterior antenna through a hole in a wall of the cooking appliance for wirelessly retransmitting wireless signals received by the wireless signal repeater.

* * * * *